United States Patent
Li et al.

(10) Patent No.: US 9,967,357 B2
(45) Date of Patent: May 8, 2018

(54) PROXY SERVICE FACILITATION

(71) Applicant: EMPIRE TECHNOLOGY DEVELOPMENT LLC, Wilmington, DE (US)

(72) Inventors: Daqi Li, Xi'an (CN); Jun Fang, Xi'an (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 407 days.

(21) Appl. No.: 14/648,001

(22) PCT Filed: Mar. 6, 2014

(86) PCT No.: PCT/CN2014/072970
§ 371 (c)(1),
(2) Date: May 28, 2015

(87) PCT Pub. No.: WO2015/131365
PCT Pub. Date: Sep. 11, 2015

(65) Prior Publication Data
US 2015/0350363 A1  Dec. 3, 2015

(51) Int. Cl.
*G06F 15/173* (2006.01)
*H04L 29/08* (2006.01)
(Continued)

(52) U.S. Cl.
CPC .... *H04L 67/2838* (2013.01); *G06F 17/30864* (2013.01); *G06Q 50/01* (2013.01)

(58) Field of Classification Search
CPC .......... H04L 67/2838; G06F 17/30864; G06Q 50/01
See application file for complete search history.

(56) References Cited

U.S. PATENT DOCUMENTS

2003/0126031 A1  7/2003  Asami
2004/0039827 A1* 2/2004  Thomas ............... H04L 29/06
                                                   709/228
(Continued)

FOREIGN PATENT DOCUMENTS

CN  1394315 A  1/2003
CN  101860560 A  10/2010
(Continued)

OTHER PUBLICATIONS

"Get a Guaranteed Supply of New Dates—Automatically—With Your Own Virtual Dating Assistant," accessed at https://web.archive.org/web/20140208031942/http://www.virtualdatingassistants.com/, accessed on Dec. 30, 2014, pp. 1-5.
(Continued)

*Primary Examiner* — Krisna Lim

(57) ABSTRACT

A proxy requestor, who is expected to participate in events hosted on a computing network, may hope to find a proxy to handle the events for the proxy requestor. The proxy requestor, using a requestor device, may submit a request for such proxy to a proxy service provider during or prior to the event. In some examples, the proxy service provider may transmit one or more candidate proxies to the requestor device. Once the proxy requestor device selects a proxy from among the one or more candidate proxies, the requestor device may either facilitate or schedule a connection between the selected proxy and other participants of the events.

22 Claims, 5 Drawing Sheets

(51) Int. Cl.
*G06F 17/30* (2006.01)
*G06Q 50/00* (2012.01)

(56) References Cited

U.S. PATENT DOCUMENTS

| | | | |
|---|---|---|---|
| 2006/0047742 A1* | 3/2006 | O'Neill | H04L 49/25 |
| | | | 709/203 |
| 2009/0307205 A1 | 12/2009 | Churchill et al. | |
| 2011/0252108 A1 | 10/2011 | Morris et al. | |
| 2012/0089700 A1* | 4/2012 | Safruti | H04L 67/2842 |
| | | | 709/217 |
| 2012/0110083 A1 | 5/2012 | Burritt et al. | |
| 2013/0166703 A1* | 6/2013 | Hammer | H04L 41/50 |
| | | | 709/220 |
| 2014/0032254 A1 | 1/2014 | Della Corte et al. | |

FOREIGN PATENT DOCUMENTS

| | | |
|---|---|---|
| CN | 103581283 A | 2/2014 |
| WO | 2007087475 A2 | 8/2007 |

OTHER PUBLICATIONS

Berman, F., "From TeraGrid to Knowledge Grid," Communications of the ACM, vol. 44, No. 11, pp. 27-28 (Nov. 2001).

Budanitsky, A., and Hirst, G., "Semantic distance in WordNet: An experimental, application-oriented evaluation of five measures," Second Meeting of the North American Chapter of the Association for Computational Linguistics, pp. 1-6 (2001).

Fiegerman, S., "New Job: Online Dating Surrogate," accessed at http://www.mainstreet.com/article/new-job-online-dating-surrogate, posted on Jun. 4, 2010, p. 1.

International Search Report and Written Opinion for counterpart International Patent Application No. PCT/CN2014/072970 dated Dec. 8, 2014.

Kaya, A., et al., "Design and Implementation of a Benchmark Testing Infrastructure for the DL System Racer," Proceedings of the KI-2004 International Workshop on Applications of Description Logics (ADL'04), Ulm, Germany, pp. 1-10 (2004).

Leacock, C., and Chodorow, M., "Combining local context and WordNet similarity for word sense identification," In book: WordNet: An Electronic Lexical Database, Publisher: MIT Press, Editors: Christiane Fellbaum, pp. 265-283 (1998).

* cited by examiner

PROXY SERVICE FACILITATION

CROSS-REFERENCE TO RELATED APPLICATION

This Application is a U.S. National Stage filing under 35 U.S.C. § 371 of International Application No. PCT/CN2014/072970, filed on Mar. 6, 2014. The disclosure of International Application No. PCT/CN2014/072970 is incorporated herein by reference in its entirety.

TECHNICAL FIELD

The technologies described herein pertain generally to facilitating proxy services responsive to a request regarding an interaction involving a requestor and another participant.

BACKGROUND

Unless otherwise indicated herein, the approaches described in this section are not prior art to the claims in this application and are not admitted to be prior art by inclusion in this section.

With respect to events hosted on social networks, in which a user is expected to participate, the user may not wish to do so for various reasons such as time constraints, incomplete knowledge of the subject matter of the event, lack of interest in the event, unwanted personal exposure of the user, etc.

SUMMARY

Technologies are generally described for facilitating proxy services. The various techniques described herein may be implemented in various methods, computer-readable mediums, computer executable products, and/or systems.

In some examples, various embodiments may be implemented as methods. Some methods may include receiving, from a requestor device, a request to provide a proxy as a substitute for a proxy requestor on a temporary basis; transmitting, to the requestor device, one or more candidate proxies based on a topic of the request and an area of expertise respectively corresponding to each of the candidate proxies; and receiving, from the requestor device, a selection of one of the candidate proxies.

In some examples, various embodiments may be implemented as computer-readable mediums having executable instructions stored thereon. Some computer-readable mediums may store instructions that, when executed, cause one or more processors to perform operations comprising receiving, from a requestor device, a request to provide a proxy as a substitute for a proxy requestor in a live interaction between the proxy requestor and another participant; transmitting, to the requestor device, a list of one or more candidate proxies based on a topic of the request and an area of expertise respectively corresponding to each of the candidate proxies; receiving, from the requestor device, a selection of one of the candidate proxies; and facilitating a communicative connection between the requestor device and the selected candidate proxy.

In some examples, various embodiments may be implemented as proxy facilitating systems. Some systems may include a requestor device that generates a request for a substitute for a proxy requestor on a temporary basis; and a proxy service provider configured to receive the request from the requestor device, transmit, to the requestor device, a list of one or more candidate proxies based on a topic of the request and an area of expertise respectively corresponding to each of the candidate proxies, and receive, from the requestor device, a selection of one of the candidate proxies.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings.

DETAILED DESCRIPTION

Figure 1:
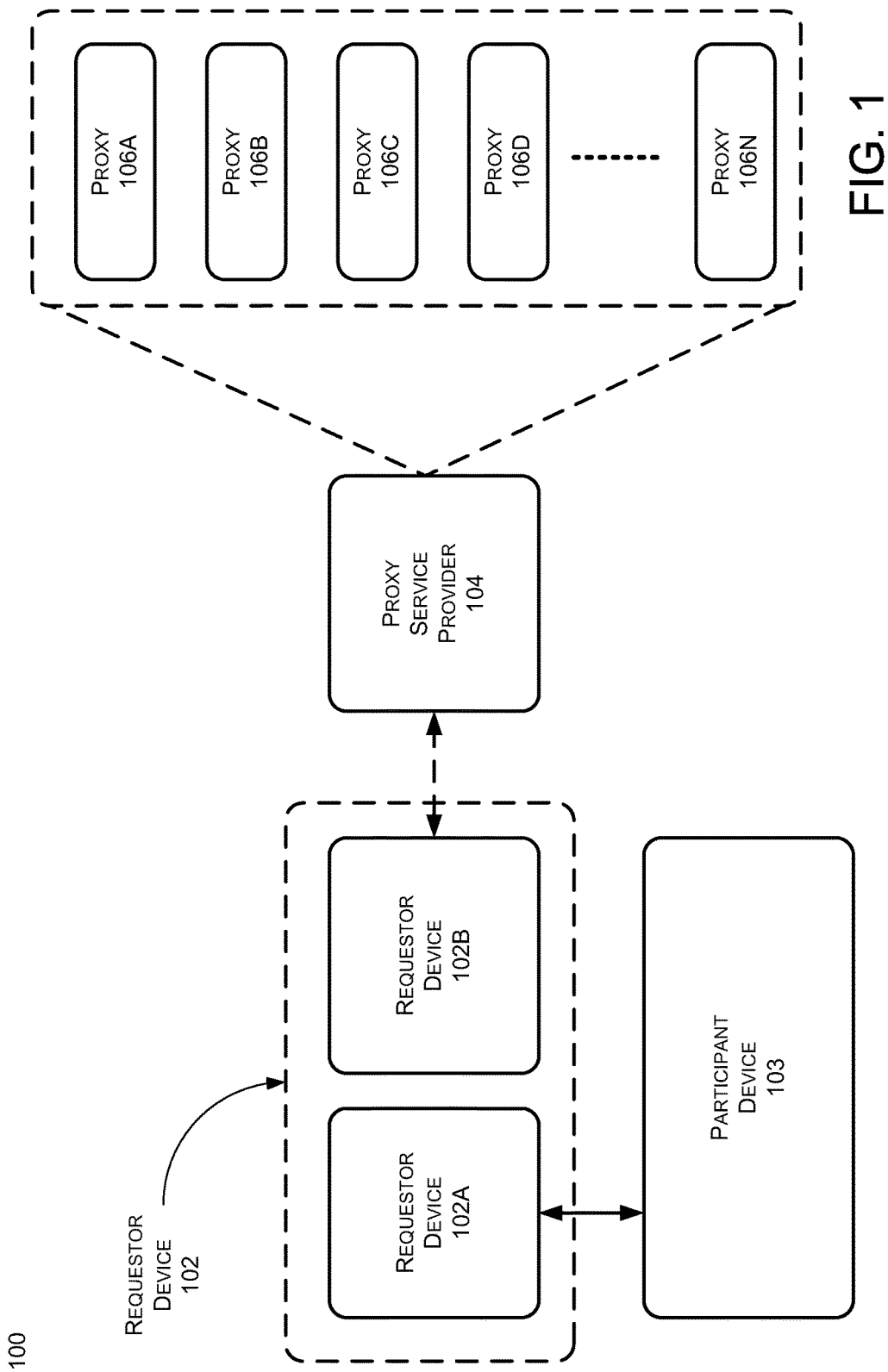
FIG. 1 shows an example system in which proxy services may be facilitated.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Briefly stated, a user may be expected to participate in business-related or social events hosted on a computing network, e.g., conference call with clients, online chat with girlfriends, etc. However, due to lack of interest in the event, limited expertise, etc., the user may choose to find a proxy to participate in the respective event on behalf of the user. To find a proxy, in some examples, the user may submit, using a device, a request for such proxy to a proxy service provider during or prior to the event. In response to the request, the proxy service provider may recommend one or more proxies that may be suitable as a fill-in for the respective event to the user. Once the user selects a proxy from among the one or more recommended proxies, the user may either facilitate or schedule a connection between the selected proxy and other participants of the respective event and the user may not have to participate in the event. In some embodiments, the proxy may assume the user's identity so that other participants of the respective event will not notice that the proxy is filling in for the user.

FIG. 1 shows an example system 100 in which proxy services may be facilitated, arranged in accordance with at least some embodiments described herein. As depicted, system 100 may include, at least, a requestor device 102, a proxy service provider 104, and one or more proxies 106A, 106B, 106C, . . . , 106N. A to N proxies are illustrated in FIG. 1 for simplicity, and one skilled in the art will appreciate that there may be a different number of proxies. Unless context requires specific reference to one or more of proxies 106A, 106B, 106C, . . . , 106N, collective reference may be made below to "proxies 106."

Requestor device 102 may refer to a general purpose computing device by which a proxy requestor, e.g., the user desiring to schedule a proxy, communicates with proxy service provider 104 and with other participants of an interaction. The interaction may refer to any form of communication or exchange of information between two or more parties via a computing network or a conventional analog network. For example, the proxy requestor may conduct or be scheduled to conduct an online interview with a reporter or journalist. During or prior to the interview, the proxy requestor may decide to not actually participate in the interview. Instead, the proxy requestor may intend to find a proxy, e.g., a substitute or an expert on the subject matter of the interview, who could fill-in for the proxy requestor during the interview. Stated another way, the proxy requestor may select a proxy to participate in the interview on the proxy requestor's behalf whether or not the requestor participates in the interview when the proxy fills-in.

In at least some alternative embodiments, requestor device 102 may refer to one or both of requestor device 102A and requestor device 102B, both of which may be owned or at least controlled by the proxy requestor. Thus, FIG. 1 intends to show both requestor device 102A and 102B in the role of requestor device 102, as described above, at least under the control of the proxy requestor. Either one of requestor device 102A and requestor device 102B may refer to a general purpose computing device by which the proxy requestor communicates with other participants of the interaction, while the other one of requestor device 102A and requestor device 102B may refer to a general purpose computing device by which the proxy requestor communicates with proxy service provider 104. The aforementioned alternative embodiments are not limited in quantity to two requestor devices owned or at least controlled by the proxy requestor, but are rather described in that manner here for the sake of clarity in describing embodiments of proxy service facilitation.

For the sake of clarity in describing embodiments of proxy service facilitation, general reference may be made to requestor device 102, unless context requires specific reference to one or both of requestor device 102A and requestor device 102B. It should be understood that a general reference to requestor device 102 may refer to any general purpose computing device, which is at least under the control of the proxy requestor, communicating with participant device 103 and/or communicating with proxy service provider 104.

Participant device 103 may refer to a general purpose computing device by which one of the participants of the interaction may participate in the online interaction to communicate with other participants using other general purpose computing devices. Further to the above example, participant device 103 may refer to a general purpose computing device by which the reporter or journalist communicates with the proxy requestor. Non-limiting examples of the general computing device may include a computer, a laptop, a cellphone, a tablet, etc.

Proxy service provider 104 may be configured to identify and recommend one or more candidate proxies for the proxy requestor based on, at least in part, a description of a topic or subject matter of the current or impending online interaction, as described in the request received from requestor device 102. In at least some examples, the received request may include a description of the topic or subject matter of the current or impending online interaction in the form of one or more nodes located in an ontological model.

As referenced herein, the ontological model may be a topic-node tree, the data structure of which simulates a hierarchical tree structure that includes a node ("root" hereafter) and one or more nodes branched off therefrom. One or more nodes may be further branched off from one of the one or more nodes of the topic-node tree. Each node of the tree may represent a topic or a sub-topic of the current or impending online interaction, e.g., geography, tourism, Miami, etc. The topic of the request for such proxy may be formed by the proxy requestor selecting one or more nodes of the tree. The ontological model is described in greater detail below in accordance with FIG. 2.

Proxies 106 may refer to one or more experts with an area of expertise. Proxies 106 may register with proxy service provider 104, and a database associated with proxy service provider 104 may be generated to store information regarding proxies 106. Such information may include identities, expertise, ratings, reviews, etc. Proxies 106 may operate on computing devices that may be configured to communicate with proxy service provider 104, participant device 103, and/or requestor device 102 via the computing network. Non-limiting examples of the computing devices may include computers, laptops, tablets, smartphones, etc.

Proxy service provider 104 may refer to a computing device, e.g., a server, or a software program configured to be executed on a computing device, in a computing network, which may be communicatively coupled to requestor device 102 via a network connection. Proxy service provider 104 may be configured to receive the request, for example, from requestor device 102, and to provide one or more candidate proxies as potential substitutes for the proxy requestor at least on a temporary basis based on features of the request. The proxy service provider 104 may then receive a proxy selection from the proxy requestor, utilizing requestor device 102, selected from the candidate proxies. The request, as described above, may include the description of the topic or subject matter regarding the interaction involving the proxy requestor.

Further to the aforementioned interview example, the proxy requestor may be asked questions, by the reporter or journalist, regarding a topic with which the proxy requestor is unfamiliar, e.g., the best sightseeing attractions in Miami. In such example scenario, when the online interaction is currently underway, the proxy requestor may turn to proxy service provider 104 for assistance. In another example, before the online interaction starts, if the proxy requestor anticipates questions beyond her knowledge, the proxy requestor may similarly request proxy service provider 104 to schedule a proxy to fill-in for the proxy requestor during the online interaction. A selected proxy may fill-in for the proxy requestor for a period of time during the online interaction or for a specific purpose, e.g., to answer a question regarding sightseeing attractions in Miami. In the latter scenario, the selected proxy may, effectively, be on-call during the course of the online interaction. In either example, the proxy requestor may select one or more nodes on the ontological model, which respectively indicates "geography," "tourism," and "Miami," to generate the topic of the request. In at least some examples, such selection of the one or more nodes may be made using a user interface with, e.g., one or more drop-down lists. In some other examples, the ontological model may be graphically displayed to the proxy requestor on a display device associated with requestor device 102 so that the proxy requestor may identify the topic of the request by selecting or otherwise activating the one or more displayed nodes. The request may be subsequently submitted to proxy service provider 104 in an email, an SMS text message, or via an application user interface.

Responsive to the request, proxy service provider 104 may recommend to the proxy requestor one or more candidate proxies from among proxies 106. As referenced herein, the candidate proxies may refer to potential proxies presented by proxy service provider 104 to requestor device 102. Using requestor device 102, the proxy requestor may select a proxy, although alternative embodiments may contemplate the proxy requestor selecting one or more proxies, from the candidate proxies. The recommendation of the one or more candidate proxies may be made by proxy service provider 104 based on features of the request including, e.g., the subject matter or topic of the request, an area of expertise respectively corresponding to each of proxies 106, and/or a rating value of a respective proxy. As described above, the subject matter or topic of the request may be generated based on the ontological model. The area of expertise for each of the respective proxies 106 may be represented by a knowledge database represented by at least a portion of the ontological model. For example, with respect to a medical doctor whose expertise covers surgery and therapy, the corresponding knowledge database may be the portion of the ontological model that includes the nodes: "medical science," "surgery," and "therapy." The rating value of a respective proxy may be generated by proxy service provider 104 based on reviews by previous proxy requestors. In some examples, the rating value may be represented by a number of stars or a numeric value.

In accordance with an example embodiment, proxy service provider 104 may be configured to recommend the candidate proxies based on a calculation of a value indicative of the suitability of the request and each of proxies 106. The calculation of the value indicative of the suitability may be based on factors that include, but are not limited to, the subject matter or topic of the request, the areas of expertise, and the rating values, all of which may be represented as symbols for brevity. That is, the subject matter or topic of the request for a proxy may be represented by $n^{user}$. The area of expertise of a respective one of proxies 106, corresponding to one or more nodes in the ontological model, may be represented by vector $N^{expert} = \{n_1^{expert}, n_2^{expert}, \ldots\}$, in which each element of the vector represents a node in the ontological mode. For example, the vector that indicates the area of expertise of the aforementioned medical doctor may be represented by $N^{expert} = \{$medical science, surgery, psychology$\}$. The rating value of a respective proxy may be represented by $C^{expert} = \{c_1^{expert}, c_2^{expert}, \ldots\}$, in which each element indicates a rating value corresponding to one element of $N^{expert}$. Based on the above representation of factors for the calculation of values indicative of the suitability of the request and each of proxies 106, the suitability value for each of proxies 106 may be calculated in accordance with the following formula.

$$S(n^{user}, N^{expert}) = \max_{i=1}[\alpha \cdot \mathrm{sim}(n^{user}, n_i^{expert}) + \beta \cdot c_i^{expert}], 1 \geq \beta > 0, 1 \geq \alpha > 0$$

in which S represents the suitability value, $\alpha$ and $\beta$ respectively represents a weight assigned to the area of expertise and the rating value, and sim( ) represents one of multiple currently existing algorithm to calculate a semantic distance in a lexical database, e.g., WordNet. When $\alpha$ and $\beta$ are respectively adjusted to another value by proxy service provider 104, the area of expertise and the rating value may be weighted differently to indicate a different level of importance with respect to the subject matter or topic of the request. When the suitability value has been calculated for each of proxies 106, proxy service provider 104 may select one or more from proxies 106, each of which respectively corresponds to one of one or more suitability values greater than a predetermined threshold suitability value. The selected one or more proxies may be recommended to the proxy requestor via requestor device 102 as the candidate proxy or may serve as a basis for further selection as described below.

Alternatively or in addition to the above example embodiment, proxy service provider 104 may be configured to select the candidate proxies from the above selected proxies or from proxies 106. Such selection may be made by proxy service provider 104 based on a calculation of a semantic relatedness value between the topic of the request and the above selected proxies (or proxies 106). Prior to the calculation of the semantic relatedness value, the topic of the request and the corresponding knowledge databases may be respectively formatted, by proxy service provider 104, in a form of one or more semantic formulae. As referenced herein, a semantic formula may refer to an arrangement of words and logic symbols, which may be used as a format of a conclusory statement of the topic of the request and the corresponding knowledge databases. A semantic formula may include one or more atomic formulae, which may refer to an arrangement of portions of semantic data, e.g., words or descriptive terms, upon which the conclusory statement of the semantic formula is based. The semantic formula of the subject matter or topic of the request for a proxy for the proxy requestor may be referred to as EF. A negative form of the semantic formula of the subject matter or topic may also be introduced for further calculation as $EF_{neg}$. The semantic formulae for each of the knowledge databases may be respectively referred to as $O_e$.

Further to the above converting, proxy service provider 104 may be configured to transform the above semantic formulae, e.g., $EF_{neg}$ and $O_e$, into fundamental forms of the semantic formulae, e.g., a form of the semantic formulae that conveys the same meaning in different format. That is, proxy service provider 104 may be configured to repeatedly apply at least one of five basic semantic rules until the five basic semantic rules become inapplicable to the semantic formulae, i.e., no portion in the semantic formula corresponds to the left hand side of the equation that represents the basic semantic rule. The five basic semantic rules include: $P(x) \rightarrow Q(x) = \neg P(x) \vee Q(x)$, $\neg \exists x P(x) = \forall x \neg P(x)$, $\neg \forall x P(x) = \exists x \neg P(x)$, $\neg(P(x) \wedge Q(x)) = \neg P(x) \vee \neg Q(x)$, and $\neg(P(x) \vee Q(x)) = \neg P(x) \wedge \neg Q(x)$, wherein x represents subject matter of a description, P(x) and Q(x) respectively represent a first and a second description of the subject matter. For example, $\neg \exists x P(x) = \forall x \neg P(x)$ means if there is no x that satisfies description P(x), then all x satisfies a negation of P(x). The basic semantic rules also include known mathematic symbols, e.g., →(be), ∃ (exist), ∀ (all), ∨ (union), ∧ (intersection), and ¬ (negation). With respect to a semantic formula, proxy service provider 104 may convert a portion of semantic data of the semantic formula corresponding to the left part of a basic semantic rule to the right part. Thus, for example, when x represents "a species of bird" and P(x) represents a description of this species of bird, e.g., "eats mice," ¬∃xP(x) may represent "there is not a species of bird that eats mice" and may be converted to ∀x ¬P(x) that represents "all birds don't eat mice," which has the same meaning as ¬∃xP(x).

Once the semantic formulae, e.g., $EF_{neg}$ and $O_e$, are converted to the fundamental forms of the semantic formulae, proxy service provider 104 may calculate the semantic relatedness value for each of the selected proxies or proxies 106. The fundamental form of the negative form of the semantic formula of the topic of the request may be referred to as "topic standard formula" herein. The fundamental forms of the semantic formulae of the knowledge database of one of the proxies may be referred to as "proxy standard formulae." If an atomic formula is included in the topic standard formula and the negative form of the atomic formula is included in a proxy standard formula, the semantic formula corresponding to the proxy standard formula may be deemed to be semantically relevant to the subject matter or topic of the request for a proxy for the proxy requestor. A count of such semantic formulae, which is semantically relevant to the subject matter or topic, of a given proxy may be calculated as the semantic relatedness value with respect to the proxy.

With respect to proxies 106 or the previously selected proxies, based on the semantic relatedness values of the above selected proxies (or proxies 106), proxy service provider 104 may be configured to select one or more proxies for the proxy requestor, the semantic relatedness values of which are greater than a threshold relatedness value. The threshold relatedness value may be predetermined by the proxy requestor or a system administrator. The selected one or more proxies may then be recommended, by proxy service provider 104, to the proxy requestor via requestor device 102, as the candidate proxies. Utilizing requestor device 102, the proxy requestor may accordingly select one of the candidate proxies and submit the selection to proxy service provider 104.

Responsive to the selection submitted by the proxy requestor, proxy service provider 104 may perform different processes, as described below, depending on whether the proxy requestor submitted the request during or prior to the interaction.

When the request for a proxy is submitted by the proxy requestor during the course of the online interaction, proxy service provider 104 may be configured to establish a communicative connection between requestor device 102 and a computing device utilized by the selected candidate proxy. Non-limiting examples of the communicative connection may include one or more communication links may be implemented utilizing non-cellular technologies such as conventional analog AM or FM radio, Wi-Fi™, wireless local area network (WLAN or IEEE 802.11), WiMAX™ (Worldwide Interoperability for Microwave Access), Bluetooth™, hard-wired connections, e.g., cable, phone lines, and other analog and digital wireless voice and data transmission technologies. In at least one example, requestor device 102 may be configured to relay data packets between the computing device utilized by the selected candidate proxy and participant device 103.

When the request for a proxy is submitted by the proxy requestor prior to the start of the online interaction, proxy service provider 104 may forward contact information of the selected candidate proxy to requestor device 102. Non-limiting examples of the contact information may include an email address, an IP address, etc. Requestor device 102 may generate a private key with time constraints based on account information, e.g., user name and password, of the proxy requestor. The private key may be transmitted, by requestor device 102, to the computing device utilized by the selected candidate proxy such that the selected candidate proxy, utilizing the computing device, may log in to an account of the proxy requestor to participate in the interaction.

During the interaction, the selected candidate proxy may assume the identity of the proxy requestor such that other participants of the online interaction may not realize that the proxy requestor has been replaced by the selected candidate proxy.

Subsequent to the end of the online interaction, proxy service provider 104 may receive a review provided from requestor device 102 to indicate the proxy requestor's level of satisfaction with the selected proxy in the online interaction. Based on the review, proxy service provider 104 may update the rating value of the corresponding proxy. In at least some examples, proxy service provider 104 may be configured to charge the proxy requestor a fee, e.g., submit a billing request to requestor device 102, based on the rating value of the proxy, the duration of the interaction, and/or the topic of the request.

Figure 2:
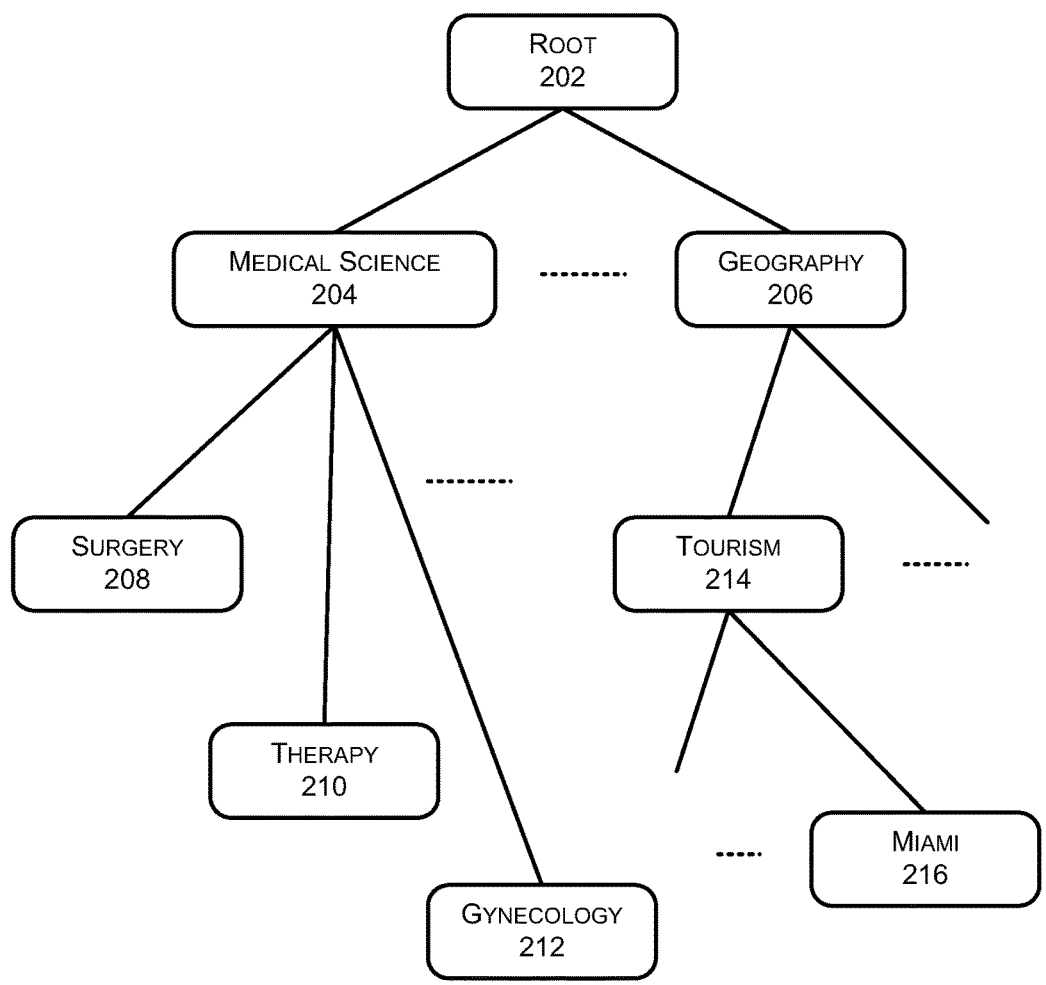
FIG. 2 shows an example ontological model by which proxy services may be facilitated.

FIG. 2 shows an example ontological model 200 by which proxy services may be facilitated, arranged in accordance with at least some embodiments described herein.

As depicted, example ontological model 200 may include one or more nodes expanded from a root node. Each of the one or more nodes may represent a topic or a sub-topic. Non-limiting examples of the topics or sub-topics may include "science," "art," "history," "handcraft," "physics," "oil painting," "archeology," "math," etc. When example ontological model 200 simulates a hierarchical tree, a node and the nodes branched off therefrom may be referred to as a subtree.

As depicted, root 202 may include at least "medical science" 204 and "geography" 206; "medical science" 204 may include at least "surgery" 208, "therapy" 210, and "gynecology" 212; "geography" 206 may include at least "tourism" 214 that may further include "Miami" 216.

As described above, when the proxy requestor requests a proxy before or during the online interaction, the proxy requestor may select one or more nodes in example ontological model 200 to describe the subject matter or topic in the request. Further to the example above, the proxy requestor may select "geography" 206, "tourism" 214, and "Miami" 216 to indicate that the proxy requestor requests proxy services regarding tourism in Miami.

In addition to providing a basis for the proxy requestor to describe the subject matter or topic of the request for a proxy, portions of example ontological model 200 may represent the areas of expertise of proxies 106. For example, a portion of example ontological model 200 that includes "medical science" 204 and "surgery" 208 may represent the area of expertise of a medical doctor who is skilled in surgery.

Figure 3:
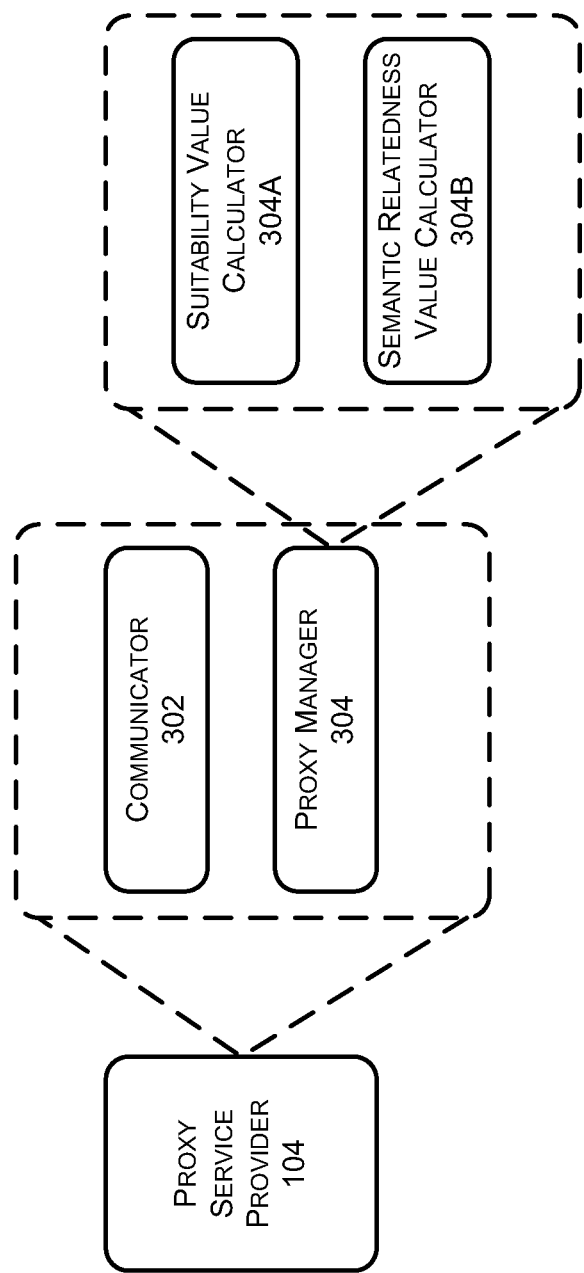
FIG. 3 shows an example proxy service provider by which proxy services may be facilitated.

FIG. 3 shows an example proxy service provider 104 by which proxy services may be facilitated, arranged in accordance with at least some embodiments described herein. As depicted, example proxy service provider 104 may include at least a communicator 302 and a proxy manager 304. Proxy manager 304 may include at least a suitability value calculator 304A and a semantic relatedness value calculator 304B.

Communicator 302 may refer to a component that may be configured to receive the request for a proxy for the proxy requestor, and to provide one or more proxies as potential substitutes for the proxy requestor at least on a temporary basis. The request, as described above, may include the description of the subject matter or topic encountered during or anticipated prior to an online interaction involving the proxy requestor. Additionally, when one or more candidate proxies are selected by proxy manager 304, communicator 302 may be configured to transmit a list of the candidate proxies to requestor device 102 and, further, to receive a selection of one of the candidate proxies from requestor device 102. In accordance with various embodiments, communicator 302 may be implemented as hardware, software, firmware, or any combination thereof.

Proxy manager 304 may refer to a component that may be configured to recommend one or more candidate proxies from among proxies 106 based on features of the request including, e.g., the subject matter or topic of the request, the area of expertise respectively corresponding to each of proxies 106, and/or the rating value of a respective proxy. That is, proxy manager 304 may be configured to select one or more of proxies 106 based on a calculation of a value indicative of the suitability of the request and each of proxies 106 and, alternatively or additionally, to select the candidate proxies from the one or more selected proxies based on a calculation of a semantic relatedness value between the topic of the request and the above selected proxies (or proxies 106). In at least some examples, proxy manager 304 may be implemented as hardware, software, firmware, or any combination thereof.

Suitability value calculator 304A may refer to a component that may be configured to calculate the suitability value between the request and each of proxies 106 based on the aforementioned factors. The calculation of the value indicative of the suitability may be based on factors that include, but are not limited to, the subject matter or topic of the request, the areas of expertise, and the rating values, all of which may be represented as symbols. That is, the subject matter or topic of the request may be represented by $n^{user}$. The area of expertise, as corresponding to one or more nodes in the ontological model, may be symbolized as a vector $N^{expert}=\{n_1^{expert}, n_2^{expert}, \ldots\}$, in which each element of the vector represents a node in the ontological mode. For example, the vector that indicates the area of expertise of the aforementioned medical doctor may be symbolized as $N^{expert}=\{$medical science, surgery, psychology$\}$. The rating value of a respective proxy may be represented by $C^{expert}=\{c_1^{expert}, c_2^{expert}, \ldots\}$, in which each element indicates a rating value corresponding to one element of $N^{expert}$. Based on the above representation of factors for the calculation of values indicative of the suitability of the request and each of proxies 106, the suitability value for each of proxies 106 may be calculated in accordance with the following formula.

$$S(n^{user}, N^{expert}) = \max_{i=1}[\alpha \cdot \text{sim}(n^{user}, n_i^{expert}) + \beta \cdot c_i^{expert}], 1 \geq \beta > 0, 1 \geq \alpha > 0$$

in which S represents the suitability value, $\alpha$ and $\beta$ respectively represents a weight assigned to the area of expertise and the rating value, and sim( ) represents one of multiple currently existing algorithm to calculate a semantic distance in a lexical database, e.g., WordNet. When $\alpha$ and $\beta$ are respectively adjusted to another value by proxy manager 304, the area of expertise and the rating value may be weighted differently to indicate a different level of importance with respect to the subject matter or topic of the request. When the suitability value has been calculated for each of proxies 106, proxy manager 304 may be configured to select one or more from proxies 106, which correspond to one or more suitability values greater than a predetermined threshold suitability value. In accordance with various embodiments, suitability value calculator 304A may be implemented as hardware, software, firmware, or any combination thereof.

Semantic relatedness value calculator 304B may refer to a component that may be configured to calculate the semantic relatedness value between the topic of the request and the above selected proxies (or proxies 106).

Prior to the calculation of the semantic relatedness value, the topic of the request and the corresponding knowledge databases may be respectively formatted, by semantic relatedness value calculator 304B, in a form of one or more semantic formulae. The semantic formula of the subject matter or topic of the request for a proxy for the proxy requestor may be referred to as EF. A negative form of the semantic formula of the topic may also be introduced for further calculation as $EF_{neg}$. The semantic formulae for each of the knowledge databases may be respectively referred to as $O_e$.

Further to the above converting, semantic relatedness value calculator 304B may be configured to transform the above semantic formulae, e.g., $EF_{neg}$ and $O_e$, into fundamental forms of the semantic formulae, e.g., a form of the semantic formulae that conveys the same meaning in different format. That is, semantic relatedness value calculator 304B may be configured to repeatedly apply at least one of five basic semantic rules until the five basic semantic rules become inapplicable to the semantic formulae, i.e., no portion in the semantic formula corresponds to the left hand side of the equation that represents the basic semantic rule. The five basic semantic rules include: $P(x) \rightarrow Q(x) = \neg P(x) \vee Q(x)$, $\neg \exists x P(x) 32 \forall x \neg P(x)$, $\neg \forall x P(x) = \exists x \neg P(x)$, $\neg(P(x) \wedge Q(x)) = \neg P(x) \vee \neg Q(x)$, and $\neg(P(x) \vee Q(x)) = \neg P(x) \wedge \neg Q(x)$, wherein x represents subject matter of a description, $P(x)$ and $Q(x)$ respectively represent a first and a second description of the subject matter. The basic semantic rules also include known mathematic symbols, e.g., $\rightarrow$ (be), $\exists$ (exist), $\forall$ (all), $\vee$ (union), $\wedge$ (intersection), and $\neg$ (negation).

Once the semantic formulae, e.g., $EF_{neg}$ and $O_e$, are converted to the fundamental forms of the semantic formulae, semantic relatedness value calculator 304B may calculate the semantic relatedness value for each of the selected proxies or proxies 106. The fundamental form of the negative form of the semantic formula of the topic of the request is referred to as "topic standard formula" herein. The fundamental forms of the semantic formulae of the knowledge database of one of the proxies are referred to as "proxy standard formulae." If an atomic formula is included in the topic standard formula and the negative form of the atomic formula is included in a proxy standard formula, the semantic formula corresponding to the proxy standard formula may be deemed to be semantically relevant to the subject matter or topic of the request for a proxy for the proxy requestor. A count of such semantic formulae, which is semantically relevant to the topic, of a given proxy may be calculated as the semantic relatedness value with respect to the proxy.

Figure 4:
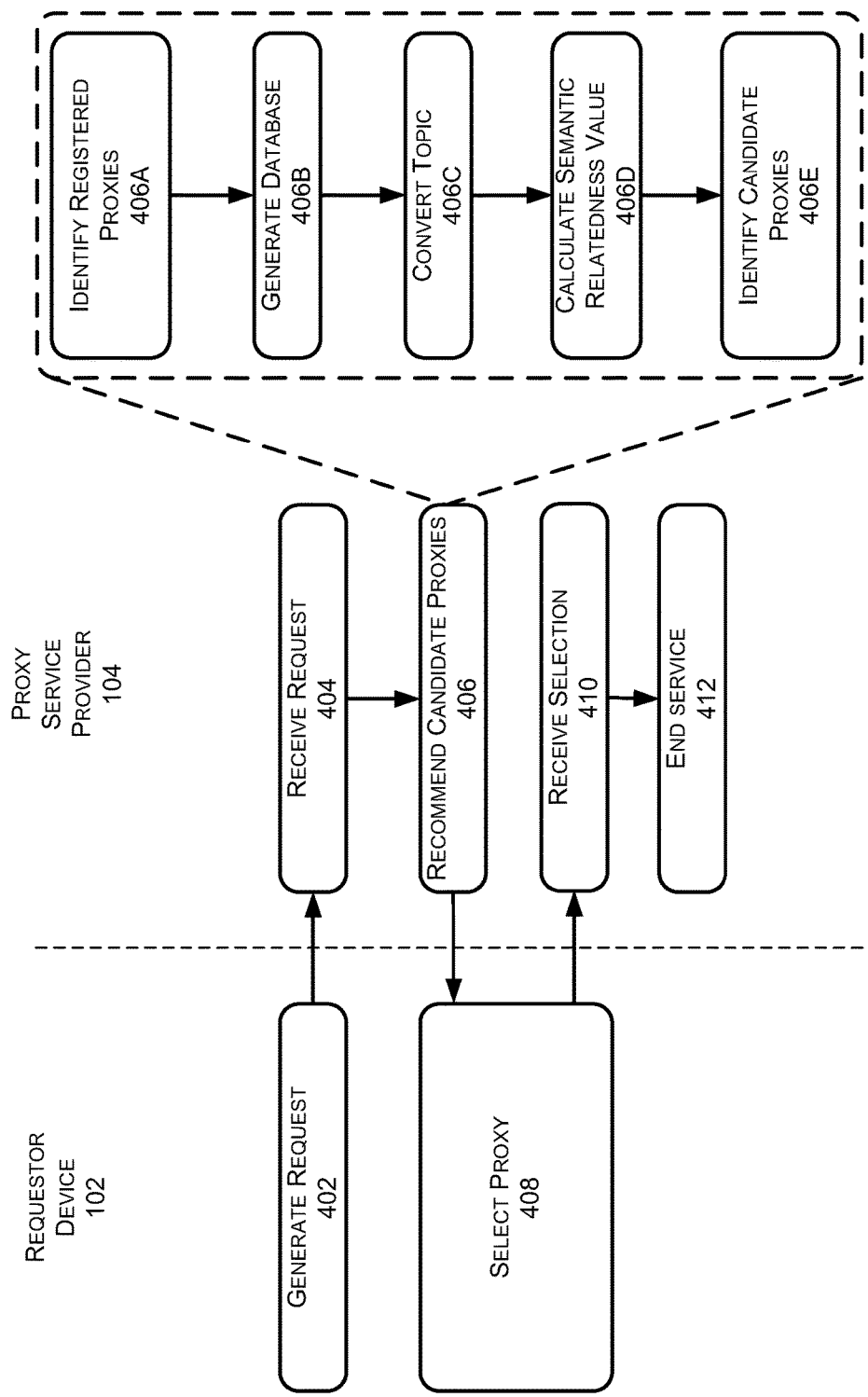
FIG. 4 shows an example interaction between a requestor and a proxy service provider to request and obtain a proxy.

FIG. 4 shows an example interaction between a requestor and a proxy service provider to request and obtain a proxy, arranged in accordance with at least some embodiments described herein. As depicted, processing flow 400 may include sub-processes executed by various components that are part of example system 100. However, processing flow 400 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 300 may include various operations, functions, or actions as illustrated by one or more of blocks 402, 404, 406, 408, 410 and/or 412. Block 406 may include sub-blocks 406A, 406B, 406C, 406D, and/or 406E. Processing may begin at block 402.

Block 402 (Generate Request) may refer to requestor device 102 generating a request to proxy service provider 104 for a proxy who could fill-in for the proxy requestor during any portion of an online interaction involving the proxy requestor and other participants. Non-limiting examples of the online interaction may include text exchange, video chat, or audio call. As described above, in one example, a proxy requestor desiring a proxy may use requestor device 102 to generate the request for a proxy. The request may include a description of the topic or subject matter of the current or impending online interaction. Block 402 may be followed by block 404.

Block 404 (Receive Request) may refer to communicator 302 receiving the request, from requestor device 102, to provide one or more candidate proxies as potential substitutes for the proxy requestor on a temporary basis based on features of the request. Block 404 may be followed by block 406.

Block 406 (Recommend Candidate Proxies) may refer to proxy manager 304 recommending one or more candidate proxies from among proxies 106 based on features of the request including, e.g., the subject matter or topic of the request, an area of expertise respectively corresponding to each of proxies 106, and/or a rating value of a respective proxy. That is, proxy manager 304 may select one or more of proxies 106 based on a calculation of a value indicative of the suitability of the request and each one of proxies 106 and, alternatively or additionally, to select the candidate proxies from among the one or more selected proxies (or proxies 106) based on a calculation of a semantic relatedness value between the topic of the request and the above selected proxies (or proxies 106). Block 406 may include sub-blocks 406A, 406B, 406C, 406D, and/or 406E.

Sub-block 406A (Identify Registered Proxies) may refer to proxy service provider 104 identifying proxies that are registered with proxy service provider 104 as proxies 106. Proxies 106 may be registered with proxy service provider 104 so that a database associated with proxy service provider 104 may be generated by proxy service provider 104 to store information regarding proxies 106. Such information may include identities, expertise, ratings, reviews, etc. Sub-block 406A may be followed by sub-block 406B.

Sub-block 406B (Generate Database) may refer to proxy service provider 104 generating a knowledge database to represent an area of expertise of each of proxies 106. The knowledge database may be represented by at least a portion of the aforementioned ontological model. For example, a knowledge database generated for a medical doctor who is skilled in surgery may correspond to a portion of the ontological model that includes nodes "medical science" 204 and "surgery" 208. Sub-block 406B may be followed by sub-block 406C.

Sub-block 406C (Convert Topic) may refer to proxy manager 304 formatting the subject matter or topic of the request and the corresponding knowledge databases in a form of one or more semantic formulae. The semantic formula of the subject matter or topic of the request for a proxy for the proxy requestor may be referred to as EF. A negative form of the semantic formula of the subject matter or topic may also be introduced for further calculation as $EF_{neg}$. The semantic formulae for each of the knowledge databases may be respectively referred to as $O_e$. Sub-block 406C may be followed by sub-block 406D.

Sub-block 406D (Calculate Semantic Relatedness Value) may refer to semantic relatedness calculator 304B calculating the semantic relatedness value between the topic of the request and proxies 106. Further to the above converting, semantic relatedness value calculator 304B may transform the above semantic formulae, e.g., $EF_{neg}$ and $O_e$, into fundamental forms of the semantic formulae, e.g., a form of the semantic formulae that conveys the same meaning in different format. That is, semantic relatedness value calculator 304B may be configured to repeatedly apply at least one of five basic semantic rules until the five basic semantic rules become inapplicable to the semantic formulae, i.e., no portion in the semantic formula corresponds to the left hand side of the equation that represents the basic semantic rule. The five basic semantic rules include: $P(x) \rightarrow Q(x) = \neg P(x) \vee Q(x)$, $\neg \exists x P(x) = \forall x \neg P(x)$, $\neg \forall x P(x) = \exists x \neg P(x)$, $\neg (P(x) \wedge Q(x)) = \neg P(x) \vee \neg Q(x)$, and $\neg (P(x) \vee Q(x)) = \neg P(x) \wedge \neg Q(x)$, wherein x represents subject matter of a description, $P(x)$ and $Q(x)$ respectively represent a first and a second description of the subject matter. The basic semantic rules also include known mathematic symbols, e.g., $\rightarrow$ (be), $\exists$ (exist), $\forall$ (all), $\vee$ (union), $\wedge$ (intersection), and $\neg$ (negation).

Once the semantic formulae, e.g., $EF_{neg}$ and $O_e$, are converted to the fundamental forms of the semantic formulae, semantic relatedness value calculator 304B may calculate the semantic relatedness value for each of the selected proxies or proxies 106. The fundamental form of the negative form of the semantic formula of the topic of the request is referred to as "topic standard formula" herein. The fundamental forms of the semantic formulae of the knowledge database of one of the proxies are referred to as "proxy standard formulae." If an atomic formula is included in the topic standard formula and the negative form of the atomic formula is included in a proxy standard formula, the semantic formula corresponding to the proxy standard formula may be deemed as semantically relevant to the subject matter or topic of the request. A count of such semantic formulae, which is semantically relevant to the subject matter or topic, of a given proxy may be calculated as the semantic relatedness value with respect to the proxy.

Sub-block 406E (Identify Candidate Proxies) may refer to proxy manager 304 identifying one or more proxies, the semantic relatedness values of which are greater than a threshold relatedness value, as the candidate proxies. The threshold relatedness value may be predetermined by the proxy requestor or a system administrator. The candidate proxies may then be recommended, by proxy manager 304, to the proxy requestor utilizing requestor device 102. Sub-block 406E may be followed by block 408.

Block 408 (Select Proxy) may refer to the proxy requestor accordingly selecting, utilizing requestor device 102, one of the candidate proxies and submitting the selection to proxy service provider 104. Block 408 may be followed by block 410.

Block 410 (Receive Selection) may refer to communicator 302 receiving a selection of one of the candidate proxies from requestor device 102. Responsive to the selection transmitted from requestor device 102, proxy service provider 104 may perform different processes to facilitate the proxy service as described below depending on whether the proxy requestor submitted the request during or prior to the interaction.

When the request for a proxy is submitted by the proxy requestor during the course of the online interaction, proxy service provider 104 may be configured to establish a communicative connection between requestor device 102 and a computing device utilized by the selected candidate proxy. In at least one example, requestor device 102 may be configured to relay data packets between the computing device utilized by the selected candidate proxy and participant device 103.

When the request for a proxy is submitted by the proxy requestor prior to the start of the online interaction, proxy service provider 104 may forward contact information of the selected candidate proxy to requestor device 102. Non-limiting examples of the contact information may include an email address, an IP address, etc. Requestor device 102 may generate a private key with time constraints based on account information, e.g., user name and password, of the proxy requestor. Prior to the interaction, the private key may be transmitted, by requestor device 102, to the computing device utilized by the selected candidate proxy such that the selected candidate proxy may log in to an account of the proxy requestor to participate in the interaction.

During the interaction, the selected candidate proxy may assume the identity of the proxy requestor such that other participants of the online interaction may not realize that the proxy requestor has been replaced by the selected candidate proxy. Block 410 may be followed by block 412.

Block 412 (End Service) may refer to the selected candidate proxy terminating the service when at least one of one or more conditions is met or the interaction is completed. The one or more conditions may include incidents involving the proxy requestor's private information. For example, when the proxy requestor's private information, e.g., the proxy requestor's credit card information, is revealed or is about to be revealed, the selected candidate proxy may terminate the service and the proxy requestor may continue the interaction. In another example, when the selected candidate proxy assumes the identity of the proxy requestor and the other participant requests private information regarding the proxy requestor to verify the identity of the proxy requestor, the selected candidate proxy may also terminate the interaction so that the proxy requestor may continue to provide such private information.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
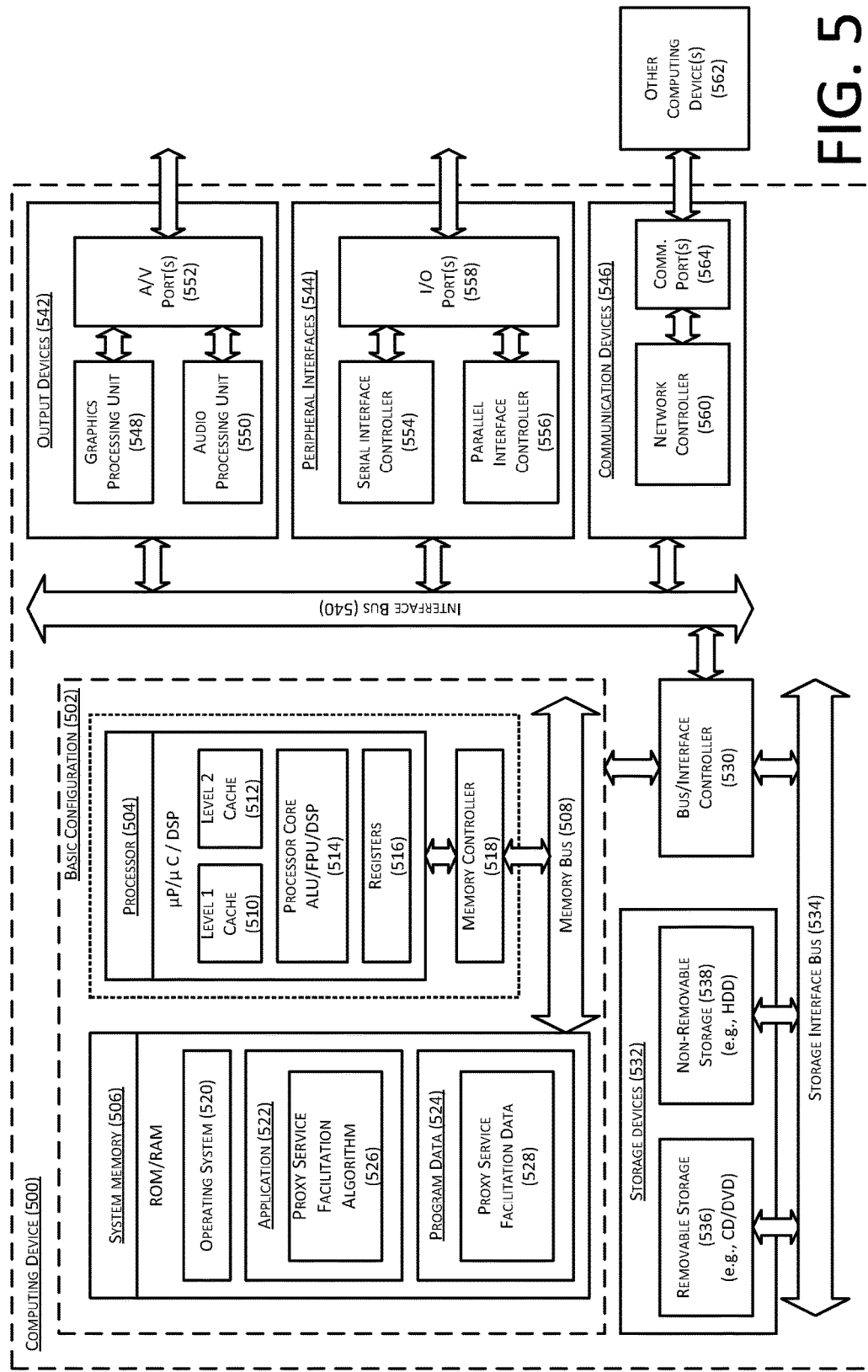
FIG. 5 shows a block diagram illustrating an example computing device that is arranged for facilitating proxy services, all arranged in accordance with at least some embodiments described herein.

FIG. 5 shows a block diagram illustrating an example computing device that is arranged for proxy service facilitation, arranged in accordance with at least some embodiments described herein.

In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include a proxy service facilitation algorithm 526 that is arranged to perform the functions as described herein including those described with respect to process 400 of FIG. 4. Program data 524 may include proxy service facilitation data 528 that may be useful for operations with proxy service facilitation algorithm 526 as is described herein. In some embodiments, application 522 may be arranged to operate with program data 524 on operating system 520 such that implementations of proxy service facilitation may be provided as described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method to provide requested assistance, the method comprising:
    receiving, from a requestor device, a request to provide a proxy as a substitute for a proxy requestor on a temporary basis;
    identifying one or more candidate proxies, from a plurality of proxies, based on a topic of the request and an area of expertise for each of the plurality of proxies, wherein identifying the one or more candidate proxies includes calculating a semantic relatedness value between each of the plurality of proxies and the topic of the request, and wherein the topic of the request and the area of expertise are stored in a database;

transmitting, to the requestor device, the identified one or more candidate proxies; and receiving, from the requestor device, a selection of one of the identified one or more candidate proxies.

2. The method of claim 1, wherein the method is implemented by a service provider.

3. The method of claim 1, wherein the request is received prior to an interaction that involves participation of the proxy requestor via the requestor device.

4. The method of claim 1, wherein the receiving a request includes receiving the request in an email, an SMS text message, or via an application user interface.

5. The method of claim 2, wherein the identifying comprises selecting the one or more candidate proxies from the plurality of proxies that are registered with the service provider.

6. The method of claim 1, further comprising generating a knowledge database for each of the plurality of proxies, wherein each of the knowledge databases is represented by an ontological model.

7. The method of claim 6, wherein the calculating comprises:
converting the topic of the request into one or more semantic formulae; and
calculating the semantic relatedness value for each of the knowledge databases and the topic of the request based on the one or more semantic formulae,
wherein the identifying comprises identifying the one or more candidate proxies from the plurality of proxies as recommended proxies based on the calculation.

8. The method of claim 1, further comprising updating a rating value of the selected candidate proxy based on a review provided by a previous proxy requestor.

9. The method of claim 8, further comprising transmitting a service fee to the requestor device, wherein the service fee is determined based on the rating value, a duration of an interaction that involves the requestor device, or the topic of the request.

10. The method of claim 1, wherein the request is received during an interaction that involves participation of the proxy requestor via the requestor device.

11. A non-transitory computer-readable medium, hosted by a service provider, that stores instructions that, when executed, cause one or more processors to perform or control performance of operations to:
receive, from a requestor device, a request to provide a proxy as a substitute for a proxy requestor during a live interaction between the proxy requestor and another participant;
transmit, to the requestor device, a list of one or more candidate proxies, from one or more proxies, based on a topic of the request and an area of expertise for each of the respective one or more proxies;
receive, from the requestor device, a selection of one of the one or more candidate proxies;
facilitate, a communicative connection between the requestor device and the selected candidate proxy during the live interaction;
receive, from the requestor device, a private key for the selected candidate proxy to log on to an account of the proxy requestor, wherein the selected candidate proxy assumes an identity of the proxy requestor to substitute the proxy requestor during the live interaction; and defer a communication of the live interaction to the proxy requestor, by the selected candidate proxy, when particular information related to the proxy requestor is requested.

12. The computer-readable medium of claim 11, wherein the the facilitation comprises exchange of contact information between the requestor device-and the selected candidate proxy.

13. The computer-readable medium of claim 11, wherein the transmission comprises selection of the one or more candidate proxies from the one or more proxies that are registered with the service provider.

14. The computer-readable medium of Claim 11, wherein the operations further comprise generation of a knowledge database for each of the one or more proxies, and wherein each of the knowledge databases is represented by an ontological model.

15. The computer-readable medium of claim 14, wherein the transmission further comprises:
conversion of the topic of the request into one or more semantic formulae;
calculation of a semantic relatedness value for each of the knowledge databases and the topic of the request based on the one or more semantic formulae; and
identification of the one or more candidate proxies from the one or more proxies as recommended proxies based on the calculation.

16. A proxy facilitating system, comprising:
a requestor device that generates a request for a substitute for a proxy requestor on a temporary basis; and
a proxy service provider, communicatively coupled to the requestor device, configured to:
receive the request from the requestor device,
transmit, to the requestor device, a list of one or more candidate proxies, from one or more proxies, based on a topic of the request and an area of expertise for each of the respective one or more proxies, and
receive, from the requestor device, a selection of one of the one or more candidate proxies,
wherein the requestor device is configured to generate a private key for the selected candidate proxy to log in to an account of the proxy requestor such that the selected candidate proxy assumes an identity of the proxy requestor on the temporary basis.

17. The system of claim 16, wherein the selected candidate proxy assumes the identity of the proxy requestor during an interaction with another participant.

18. The system of claim 17, wherein the requestor device is further configured to relay data packets regarding the interaction between computing devices utilized respectively by the another participant of the interaction and the selected candidate proxy.

19. The system of claim 17, wherein the generated private key includes one or more time restraints.

20. The system of claim 17, wherein the selected candidate proxy defers to the proxy requestor during the interaction when particular information that pertains to the proxy requestor is revealed.

21. The system of claim 17, wherein the selected candidate proxy defers to the proxy requestor during the interaction when private information related to the proxy requestor is requested.

22. The system of claim 17, wherein the interaction is facilitated in a form of text exchange, video chat, or audio call.

* * * * *

UNITED STATES PATENT AND TRADEMARK OFFICE
CERTIFICATE OF CORRECTION

PATENT NO. : 9,967,357 B2  
APPLICATION NO. : 14/648001  
DATED : May 8, 2018  
INVENTOR(S) : Daqi Li et al.

Page 1 of 1

It is certified that error appears in the above-identified patent and that said Letters Patent is hereby corrected as shown below:

In the Claims

Column 20, Line 6, Claim 12 please delete "the the facilitation comprises exchange of contact informa-" and insert thereto: -- the facilitation comprises exchange of contact informa- --

Signed and Sealed this  
Fourteenth Day of May, 2019

Andrei Iancu  
*Director of the United States Patent and Trademark Office*